(12) United States Patent  
Ogawa (10) Patent No.: US 7,703,341 B2  
(45) Date of Patent: Apr. 27, 2010

(54) PRESSURE DETECTING APPARATUS UTILIZING ELECTROMAGNETIC COUPLING

(75) Inventor: Yasuji Ogawa, Tsukuba (JP)

(73) Assignee: Xiroku, Inc. (JP)

( * ) Notice: Subject to any disclaimer, the term of this patent is extended or adjusted under 35 U.S.C. 154(b) by 245 days.

(21) Appl. No.: 10/580,452

(22) PCT Filed: Nov. 5, 2004

(86) PCT No.: PCT/JP2004/016390

§ 371 (c)(1),
(2), (4) Date: Mar. 27, 2007

(87) PCT Pub. No.: WO2005/052532

PCT Pub. Date: Jun. 9, 2005

(65) Prior Publication Data

US 2007/0214897 A1    Sep. 20, 2007

(30) Foreign Application Priority Data

Nov. 28, 2003    (JP) .................... 2003-398299

(51) Int. Cl.
*G01D 7/00* (2006.01)
(52) U.S. Cl. .................... 73/862.046
(58) Field of Classification Search ........... 73/862.046
See application file for complete search history.

(56) References Cited

U.S. PATENT DOCUMENTS

| 3,021,711 | A | * | 2/1962 | Arvidson | .................... 73/702 |
| 3,722,288 | A | * | 3/1973 | Weber | .................... 73/382 R |
| 4,353,050 | A | * | 10/1982 | Pelczyk et al. | ............... 336/30 |
| 4,658,373 | A | * | 4/1987 | Murakami et al. | ......... 700/213 |
| 4,918,418 | A | * | 4/1990 | Tsala | ........................ 336/180 |
| 4,944,187 | A | * | 7/1990 | Frick et al. | .................... 73/718 |
| 5,420,379 | A | * | 5/1995 | Zank et al. | ............... 178/19.03 |
| 5,543,588 | A | * | 8/1996 | Bisset et al. | ............. 178/18.06 |
| 5,861,583 | A | * | 1/1999 | Schediwy et al. | ........ 178/18.06 |
| 6,338,199 | B1 | * | 1/2002 | Chigira et al. | ................ 33/318 |
| 6,747,631 | B1 | * | 6/2004 | Sakamaki et al. | .......... 345/157 |

FOREIGN PATENT DOCUMENTS

| JP | 57-100331 | 6/1982 |
| JP | 62-31865 | 8/1987 |
| JP | 62 226030 | 10/1987 |

(Continued)

*Primary Examiner*—Lisa M Caputo  
*Assistant Examiner*—Octavia Davis  
(74) *Attorney, Agent, or Firm*—Wells St. John P.S.

(57) ABSTRACT

The object of the present invention is to provide a pressure detecting apparatus that is less affected from noises and can be constructed in a large size. The pressure detecting apparatus according to the present invention utilizes electromagnetic coupling. The sensor section comprises first coils 1, second coils 2 provided on the first coils such that they are superimposed to each other, and a first cushion member 3 provided between the first coils and the second coils. A drive circuit for driving either of the first coils and the second coils and a detection circuit for detecting pressure applied against the sensor section on the basis of signals resulting from electromagnetic coupling from the other of the first coils and the second coils are connected to the sensor section. The sensor sections are disposed in a matrix state so that measurements of pressure distribution can be effected.

13 Claims, 5 Drawing Sheets

FOREIGN PATENT DOCUMENTS

| | | |
|---|---|---|
| JP | 1-212301 | 8/1989 |
| JP | 2-78925 | 3/1990 |
| JP | 6-46171 | 6/1994 |
| JP | 7-55615 | 3/1995 |
| JP | 09-113203 | 5/1997 |

* cited by examiner

PRESSURE DETECTING APPARATUS UTILIZING ELECTROMAGNETIC COUPLING

CROSS REFERENCE TO RELATED APPLICATION

This is a 35 U.S.C. §371 application of and claims priority to PCT International Application Number PCT/JP2004/016390, which was filed Nov. 5, 2004, and which claims priority to Japanese Patent Application No. 2003-398299, filed Nov. 28, 2003, and the teachings of all the applications are incorporated herein by reference.

FIELD OF THE INVENTION

The present invention relates to a pressure detecting apparatus, and particularly to a pressure detecting apparatus that utilizes electromagnetic coupling caused by coils.

BACKGROUND OF THE INVENTION

Till now, various apparatuses for measuring pressure applied by an object against a sensor section and an amount of displacement thereof have been developed. In JP Laid-open No. 9-113203, for example, a sensor using a differential transformer is disclosed. This sensor is designed to detect the relative amount of displacement between a core and a differential coil to thereby determine an amount of displacement of an object. Since each of the core and the differential coils has a thickness, respectively, it is difficult to comprise them in a thin sheet. Thus, it has been difficult to apply such a sensor to a pressure distribution detecting apparatus.

There are various types of pressure distribution detecting apparatuses for detecting pressure distribution by means of a thin sheet, which include the apparatus using a pressure-sensitive rubber, the apparatus using electrostatic coupling and so on. For example, a pressure detecting apparatus using a pressure-sensitive rubber is disclosed in JP Laid-open No. 57-100331. This pressure detecting apparatus is designed, e.g. for a purpose of conducting performance assessment tests on seats for automobiles use, to lay a pressure detecting apparatus made from a pressure-sensitive rubber sheet onto a seat to determine the pressure distribution. Besides, the pressure detecting apparatus utilizing electromagnetic coupling to be used for the same usage is disclosed in JP Laid-open No. 62-226030, for example. This apparatus is also designed to use a sensor formed in a sheet to determine pressure distribution.

Patent Document 1: JP Laid-open No. 9-113203
Patent Document 2: JP Laid-open No. 57-100331
Patent Document 3: JP Laid-open No. 62-226030

SUMMARY OF THE INVENTION

As described above, although the sensor using a differential transformer can detect a part of pressure, it cannot be applied for detecting pressure distribution over a wide area. Besides, the pressure detecting apparatuses using pressure-sensitive rubber or electrostatic coupling are easily affected by noises due to their relatively-high impedance, and it has been therefore difficult to make the sensor in a large size. Such an effect caused by noises might be tolerable for a sensor if the sensor is constructed in such a size that is used for performance assessment of car seats or the like. However, in such a case that, for example, the pressure detecting apparatuses are bedded over floors in a shop to investigate the movements of visitors or are used for security purpose, it has been difficult to determine the pressure distribution with the pressure detecting apparatuses since they receive too much effect of noises.

Taking the above-described problem into consideration, it is an object of the present invention to provide a pressure detecting apparatus that utilizes electromagnetic coupling to thereby enable it to have low impedance, to be less affected from noises and to be constructed in a large size.

In order to achieve the foresaid object of the present invention, the pressure detecting apparatus utilizing electromagnetic coupling according to the invention comprises:

a sensor section including first coils, second coils provided such that they are superimposed with the first coils, and a first cushion member provided between the first and second coils, a drive circuit for driving either of the first and second coils, and a detecting circuit for detecting pressure to be applied against the sensor section based on signals resulting from electromagnetic coupling from the other of the first and second coils.

The sensor section may further include third coils to be provided at a position being on the second coils and opposing to the first coils such that they are superimposed with the second coils, and a second cushion member having a modulus of elasticity that is different from that of the first cushion member.

Further, the first and third coils may be wired such that they counteract the magnetic field, the drive circuit may be configured to cause the first and third coils to drive, and the detection circuit may be configured to detect signals resulting from electromagnetic coupling from the second coils.

In addition, the drive circuit may cause the second coils to drive, and the detection circuit may detect the difference of signals resulting from electromagnetic coupling from the first and third coils.

In this case, the detection circuit may include a differential amplifier, and the difference of signals may be detected by inputting the signals resulting from electromagnetic coupling respectively from the first and third coils to the input terminal of the differential amplifier.

Furthermore, the measurements of the pressure distribution may be effected by disposing a plurality of sensor sections in matrix state, connecting the respective first coils in series in the direction of the X-axis to form a plurality of rows of the coils, connecting the respective second coils in series in the direction of the Y-axis to form a plurality of rows of the coils, and connecting the respective third coils in series in the direction of the X-axis to form a plurality of rows of the coils.

Alternatively, the measurements of the pressure distribution may be effected by disposing a plurality of sensor sections in matrix state, connecting the respective first coils in series in the direction of the X-axis to form a plurality of rows of the coils and connecting the respective second coils in series in the direction of the Y-axis to form a plurality of rows of the coils.

In this configuration, the rows of coils other than the rows of coils to which the drive circuit or the detection circuit is connected can be disconnected or opened.

Further, a switching means for connecting the rows of coils in turn to the drive circuit or the detection circuit may be included in the pressure detecting apparatus.

Alternatively, the apparatus maybe configured such that one end of each of the whole coil rows is grounded and the other end is connected with the drive circuit or the detection circuit, that the drive circuit includes a plurality of current drivers that drive each of the plurality of rows of coils to be driven with different wave forms, respectively, and that the detection circuit includes a current amplifier for receiving signals from the plurality of coil rows, respectively, and a plurality of synchronous detection sections for separating the respective wave forms.

Each coil forming the coil rows may be a planar coil in a polygonal shape, such as schematically-square and octangle, which is separated to the right and left sides at its substantially-central portion, and may be connected to the neighbor coils in series.

Preferably, the detection circuit further includes a current amplifier whose input impedance is made close to zero.

Preferably, the drive circuit includes a current driver of which output impedance is set to a high value.

Furthermore, the central portions and/or peripheral areas of the coils may be made hollow.

The pressure detecting apparatus utilizing electromagnetic coupling according to the present invention has an advantage in that it can be made in a large size since it is less affected from noises. In addition, since the detection circuit has no complex configuration and the sensor section is constructed with coils, the pressure detecting apparatus can be produced cheaply even though it is made in a large size. Moreover, the sensor section made in the thin sheet form can be manufactured easily by employing a process tp form a coil pattern with flexible base plates or the like.

DETAILED DESCRIPTION OF THE PREFERRED EMBODIMENT

Now, the best mode for carrying out the present invention will be explained in the following with referring to the appended drawings. Note that, though a pressure detecting apparatus, in which coils are disposed in a matrix state in both directions of the X-axis and the Y-axis to capacitate the apparatus to determine the distribution of pressure will be explained in the following examples, it is not intended to limit the present invention to those examples. The pressure detecting apparatus according to this invention can naturally detect pressure by means of a set of sensors functioning as a minimal unit in such a case that it is not necessary to determine the distribution of pressure but is required to simply measure pressure.

Figure 1:
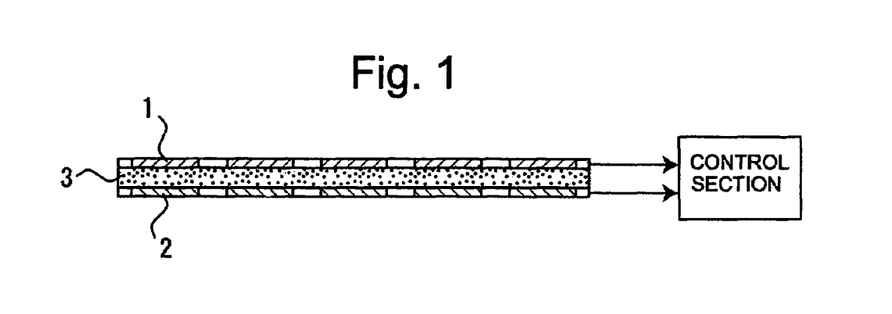
FIG. 1 is a schematic lateral cross-section for explaining the pressure detecting apparatus of Example 1 according to the present invention.
Figure 2:
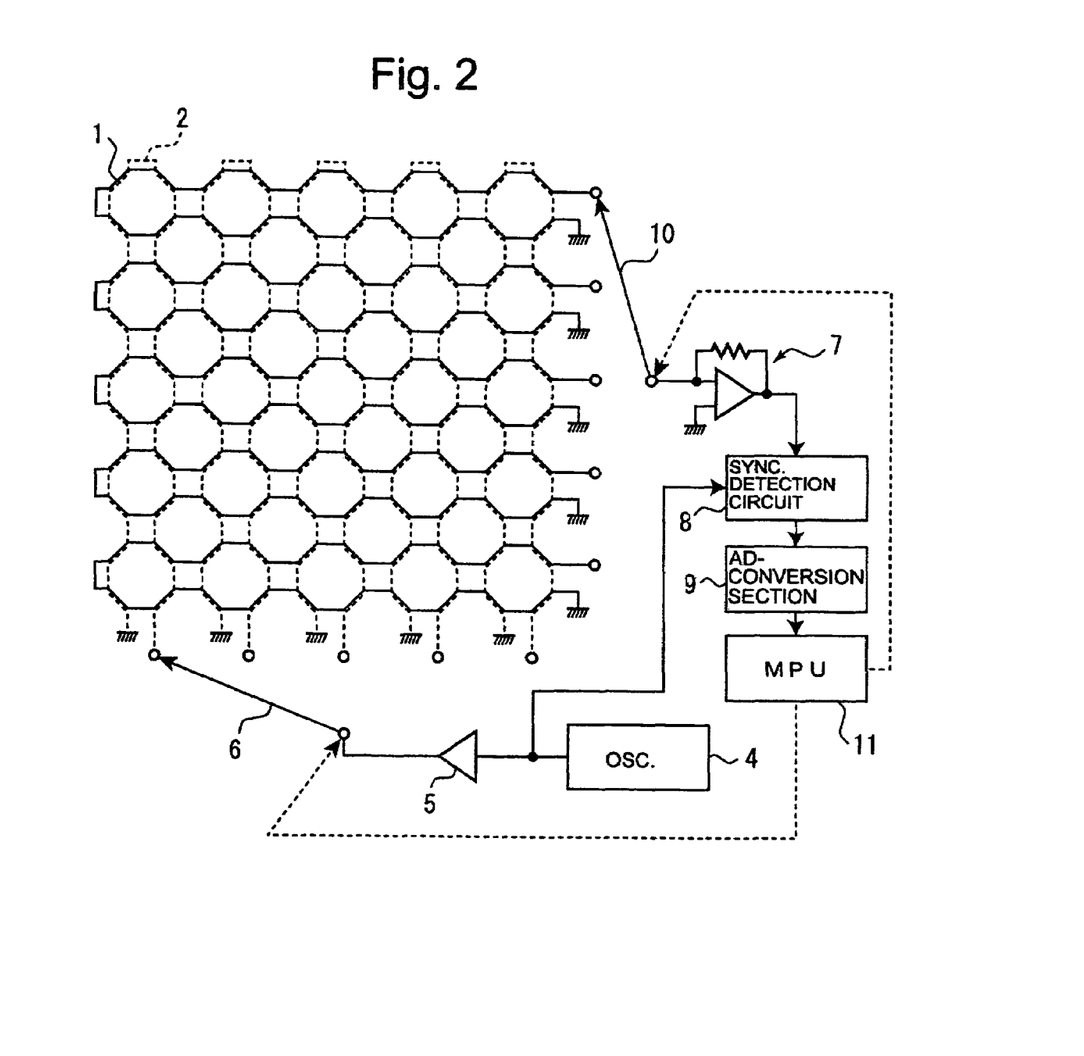
FIG. 2 is a top view for explaining the pressure detecting apparatus of Example 1 according to the present invention.

FIG. 1 is a schematic lateral cross-section for explaining the pressure detecting apparatus of Example 1 according to the present invention. FIG. 2 includes a schematic top view of the pressure detecting apparatus and a block diagram of the drive circuit and the detection circuit. As it is understandable from FIG. 1, a plurality of first coils 1 and a plurality of second coils 2 are respectively disposed to the upper and under sides of a first cushion member 3 being disposed in between the first and second coils. As can be seen from FIG. 2, the first and second coils are arranged such that they are superimposed to each other in a matrix state, and a plurality of coil rows are formed by connecting the plurality of first coils in series in the direction of the X-axis and connecting the plurality of second coils in series in the direction of the Y-axis.

The coil rows formed as described above are connected to a control section. The control section comprises a drive circuit, a detection circuit, an MPU or the like. The detection circuit is connected to the coil row formed with the first coils 1 and the drive circuit is connected to the coil row formed with the second coils 2. The detection circuit comprises, for example, a current amplifier 7, a synchronous detection section 8 and an AD conversion section 9, and they are connected to the coil rows consisting of the first coils 1 in turn with use of a switching section 10. The drive circuit comprises, for example, an oscillator 4 and a current driver 5, and the coil rows consisting of the second coils 2 are connected to the drive circuit in turn with use of a switching section 6 so that the coil rows are driven.

In addition, an MPU 11 for controlling the switching sections 6 and 10 is connected to the switching sections 6 and 10. The MPU 11 also performs processing such as pressure measurements upon receipt of signals having been detected by the detection circuit.

The respective coils may be patterned so that they can be formed in single layer, which allows to produce them with a low cost. More specifically, as shown in FIG. 2, the coil rows are formed by dividing a roll of planar coil having an octagonal shape to the right and left at the approximately central portion thereof and then connecting the divided coils to the neighbor coils in series. The one end of the coil row is connected to the drive circuit or the detection circuit via the switching section 6 or 10, and the other end is grounded. When said one end is not connected to the drive circuit or the detection circuit, the coil row is rendered in a disconnected state so that the other coil rows may not be influenced. Besides, the switching sections 6 and 10 may comprise a multiplexer or the like.

Figure 3:
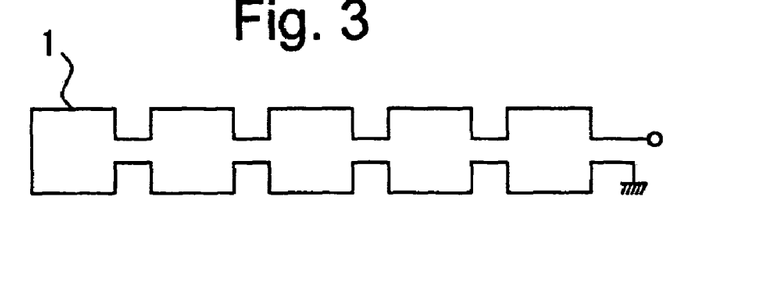
FIG. 3 is a view for explaining the coils in another shape to be used for the pressure detecting apparatus according to the present invention.
Figure 4:
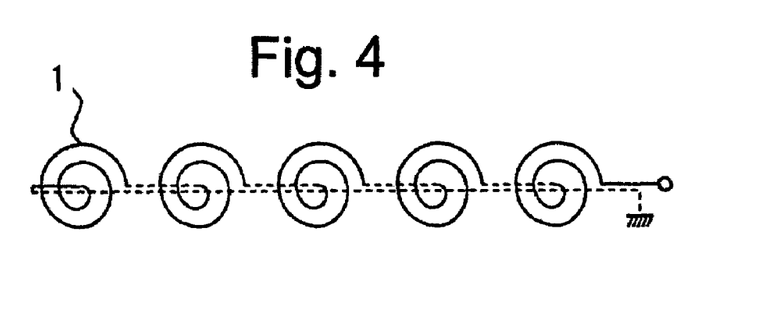
FIG. 4 is a view for explaining the coils in a still another shape to be used for the pressure detecting apparatus according to the present invention.
Figure 5:
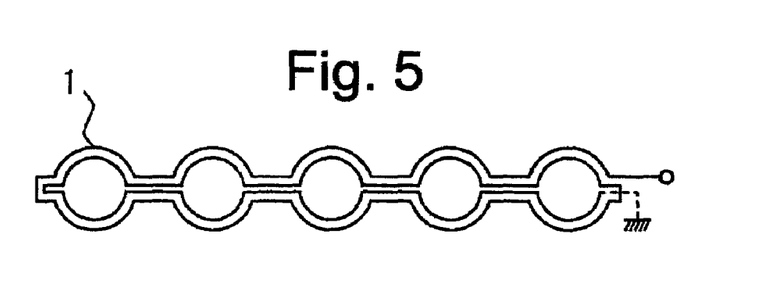
FIG. 5 is a view for explaining the coils in a still another shape to be used for the pressure detecting apparatus according to the present invention.

Note that the shape of the coil is not limited to octagonal, and it may be polygonal such as hexagonal, round, or approximately square as shown in FIG. 3. When it is required to increase the winding times of the coil, coils each having been wound plural times may be connected in series as shown in FIG. 4. Alternatively, it is also possible to provide the wiring of the coil rows so that the coil rows could be doubled, while the part of the respective coils can be formed in single layer.

The output impedance of the current driver in the drive circuit is. preferably made at a high value. Further, the current amplifier 7 in the detection is configured so that the input impedance is made at a value approximate to zero, and the current amplifier is configured such that one input terminal of the current amplifier is grounded and the other is directly inputted with outputs from the coil rows consisting of the first coils 1and is connected with a feedback resistance. The current having been amplified with the current amplifier 7 is inputted to the synchronous detection section 8. To the synchronous detection section 8, outputs from an oscillator 4 are also connected. Then, the outputs from the oscillator and signals resulting from electromagnetic coupling are synchronized, converted into digital signals in an AD conversion section and inputted to the MPU 11 where processing required for the pressure detection is carried out. In this way, since the magnitude of the electromagnetic coupling in the respective coils opposing to one another varies depending on the distance therebetween, the processings to detect pressure to be applied against the coils is carried out based on quantities of change in the electromagnetic coupling.

The procedure for measuring pressure with the pressure detecting apparatus constructed as described above will be explained in the following. When the first coils are used as a detection surface and the second coils are used as a driving surface, the current driver 5 is connected to one of the coil rows consisting of the second coils 2 with use of the switching section 6. On the other hand, the coil rows consisting of the first coils 1 are respectively connected with the current amplifier 7 in sequence with use of the switching section 10. All of the coil rows consisting of the first coils 1 were connected in sequence to the current amplifier 7, the connection of the current driver 5 having been connected by the switching section 6 is changed over to a coil row next to the connected coil row consisting of the second coils 2. Then, the coil rows consisting of the first coils 1 are connected again in sequence. This procedure is repeated so that all of the coil rows are connected to the drive circuit or the detection circuit in sequence.

When alternating current is applied to the coil rows consisting of the second coils 2, AC electromotive force is induced in the coil rows consisting of the first coils 1 as well due to the phenomenon of electromagnetic coupling by coils. The magnitude of the electromotive force generating from electromagnetic coupling varies depending on the respective distance between the opposing coils. When pressure is applied against a portion on a plurality of first coils, the first coils are bent because the first cushion member 3 is provided between the first coils and the second coils. When the upper coils are bent, the magnitude of electromagnetic coupling between the opposing coils is changed, which causes the current arising from the second coils to change. Therefore, it is possible to determine in which portion a change in signals resulting from electromagnetic coupling by the coils occurs.

Figure 6:
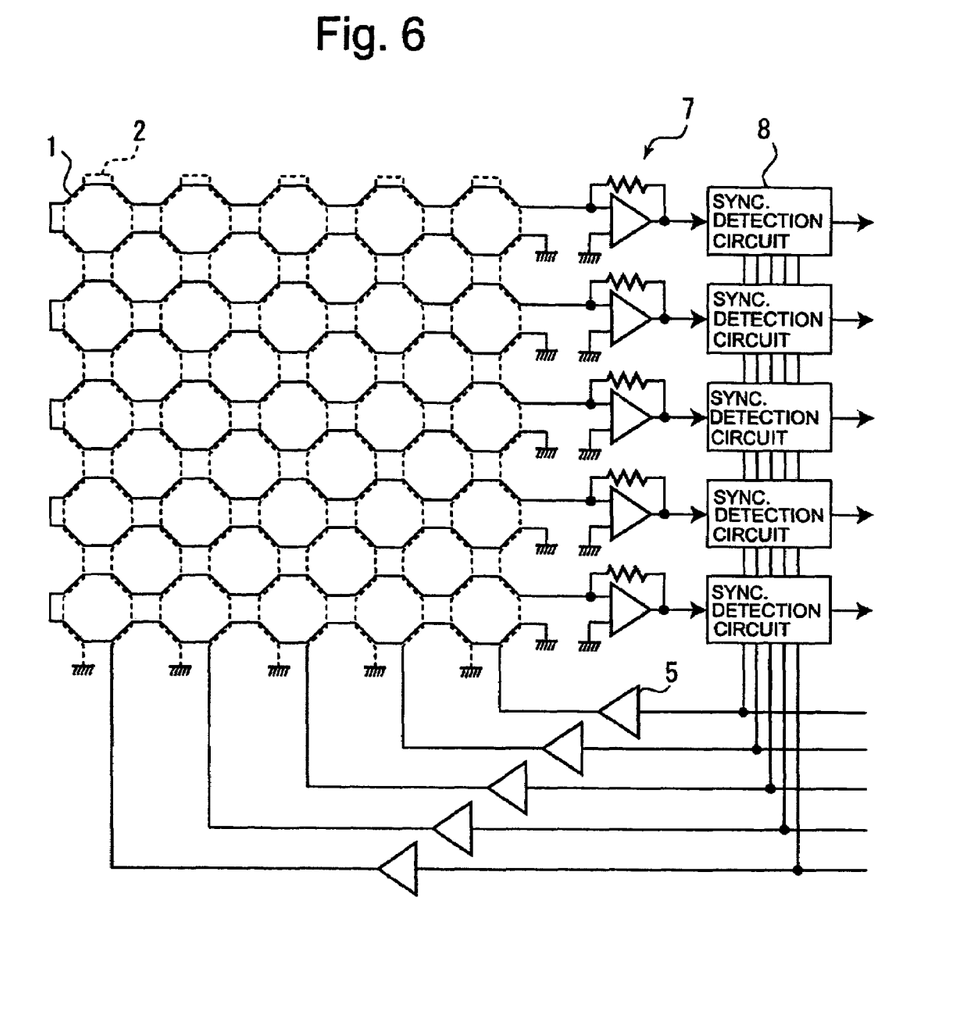
FIG. 6 is a schematic top view for explaining the other connection configuration in the pressure detecting apparatus of Example 1 according to the present invention.

Alternatively, without using the switching sections, the drive circuit or the detection circuit may be connected to all of the coil rows, respectively., FIG. 6 shows an example where the drive circuits or the detection circuits are connected to all of the coil rows, respectively. The current amplifiers 7 and the synchronous detection sections 8 are connected to the coil rows consisting of the first coils 1, respectively. Besides, to the respective coil rows consisting of the second coils 2, the current drivers 5 are connected, respectively. The plurality of current drivers 5 drive the respective coil rows with different wave forms, simultaneously. Then, at the detection circuit side, signals from the plurality of coil rows are received by the current amplifiers 7, respectively, and the respective wave forms are separated and then detected in the synchronous detection sections 8, respectively, to thereby measure the pressure distribution in the coils being disposed in a matrix state.

Note that the first and second coils can be manufactured by forming a coil pattern on a flexible substrate consisting of polyimide or the like. These coils are used for detecting pressure based on the bending of the upper coils. Therefore, the central portion and/or peripheral area of the coil may be made hollow so that the coil pattern can bend more easily. In such a case, the portions on the flexible substrate other than the portions on which the coil pattern is formed are bored to make them hollow, for example.

Figure 7:
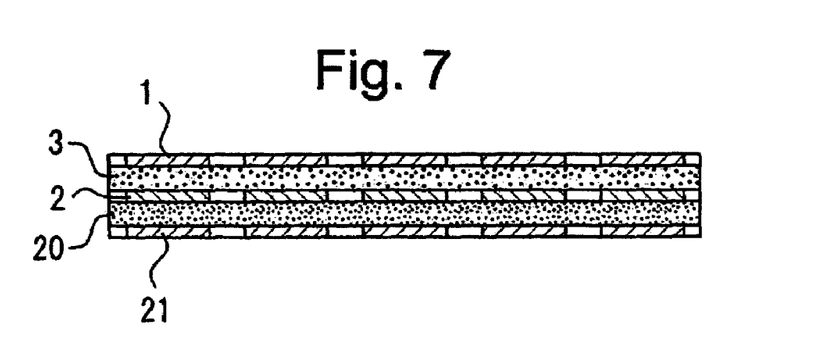
FIG. 7 is a schematic lateral cross-section for explaining the pressure detecting apparatus of Example 2 according to the present invention.

Now, the pressure detecting apparatus of the second example according to the present invention will be explained. Unlike the first example where two coil layers are formed on upper and lower sides, one more coil layer is supplemented to then use three layers in total in this example, as shown in FIG. 7. Specifically, as shown in FIG. 7, third coils 21 are provided under the second coils 2 via a second cushion member 20. For the second cushion member 20, a material having a modulus of elasticity different from that of the first cushion member 3 must be used. This material may be a hard spacer unlike the material used for the first cushion member that has cushiony property. By using materials with different moduli of elasticity, the distances between the first and second coils and between the second and third coils when pressure is applied will differ from each other, whereby detection of the difference can be made easier.

Figure 8:
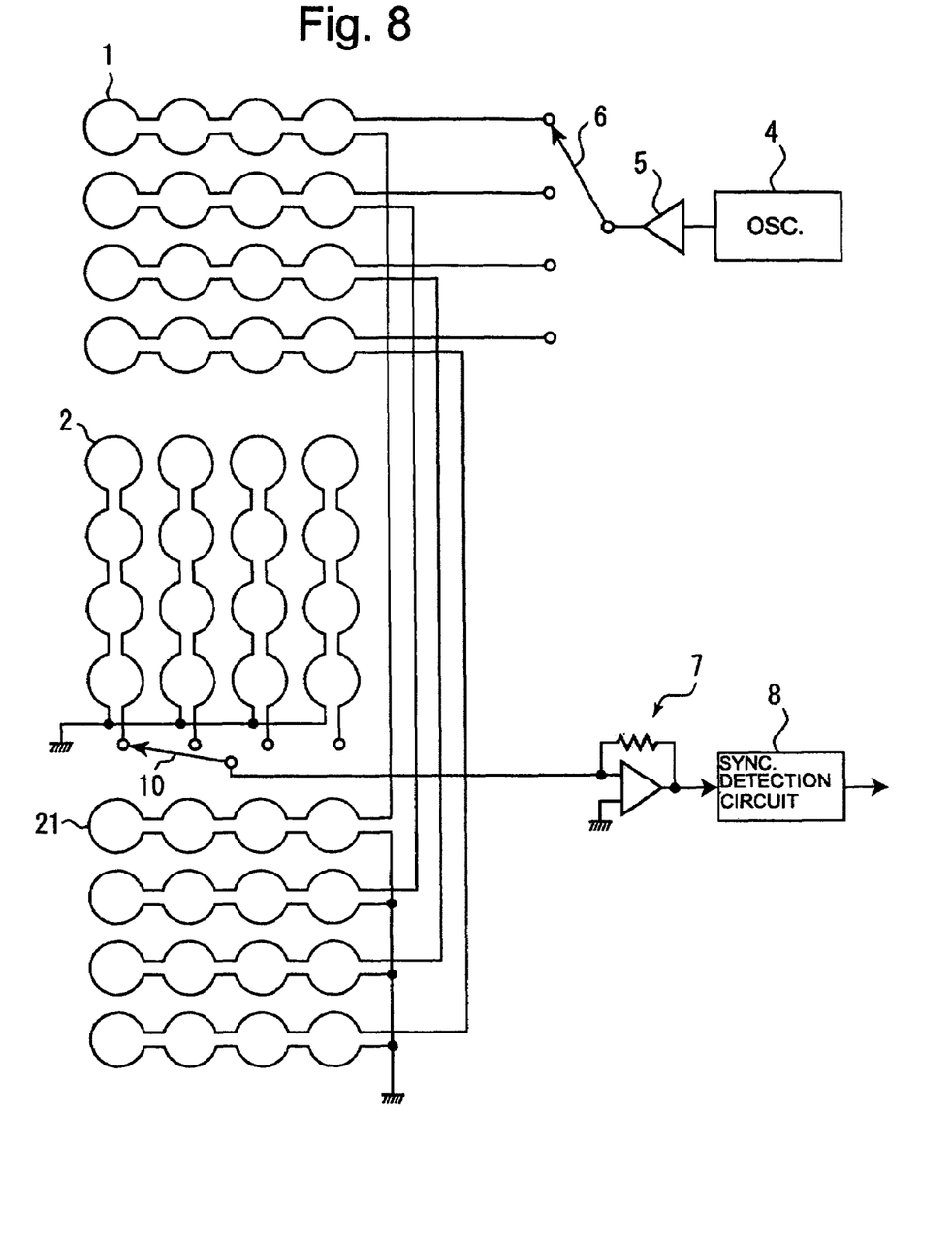
FIG. 8 is a schematic view for explaining the connection configuration in the pressure detecting apparatus of Example 2 according to the present invention.

FIG. 8 is a schematic view for explaining the connection configuration in the pressure detecting apparatus of the second example according to the present invention. In FIG. 8, the respective layers are shown in expanded views in order to facilitate understanding of the connection configurations of the coil rows formed on the respective layers. When the three coil layers are used, for example, the first coils 1 and the third coils 21 are wired so that the magnetic field can be counteracted or opened. In the example shown in FIG. 8, the first coils 1 are wound reversely relative to the winding direction of the third coils 21. Then, the drive circuits are connected to the coil rows consisting of the first coils 1 and the coil rows consisting of the third coils 21. Specifically, the drive circuits are connected to the coil rows consisting of the first coils 1, and the coil rows consisting of the first coils 1 and the coil rows consisting of the third coils 21 are connected in series. Besides, the detection circuits are connected to the coil rows consisting of the second coils 2 in order to detect signals resulting from electromagnetic coupling from the coil rows consisting of the second coils 2. With such a connection configuration, the changes of the first and third coils relative to the second coils can be detected differentially, whereby such effects to increase the detection accuracy and to be less affected from noises can be attained.

Figure 9:
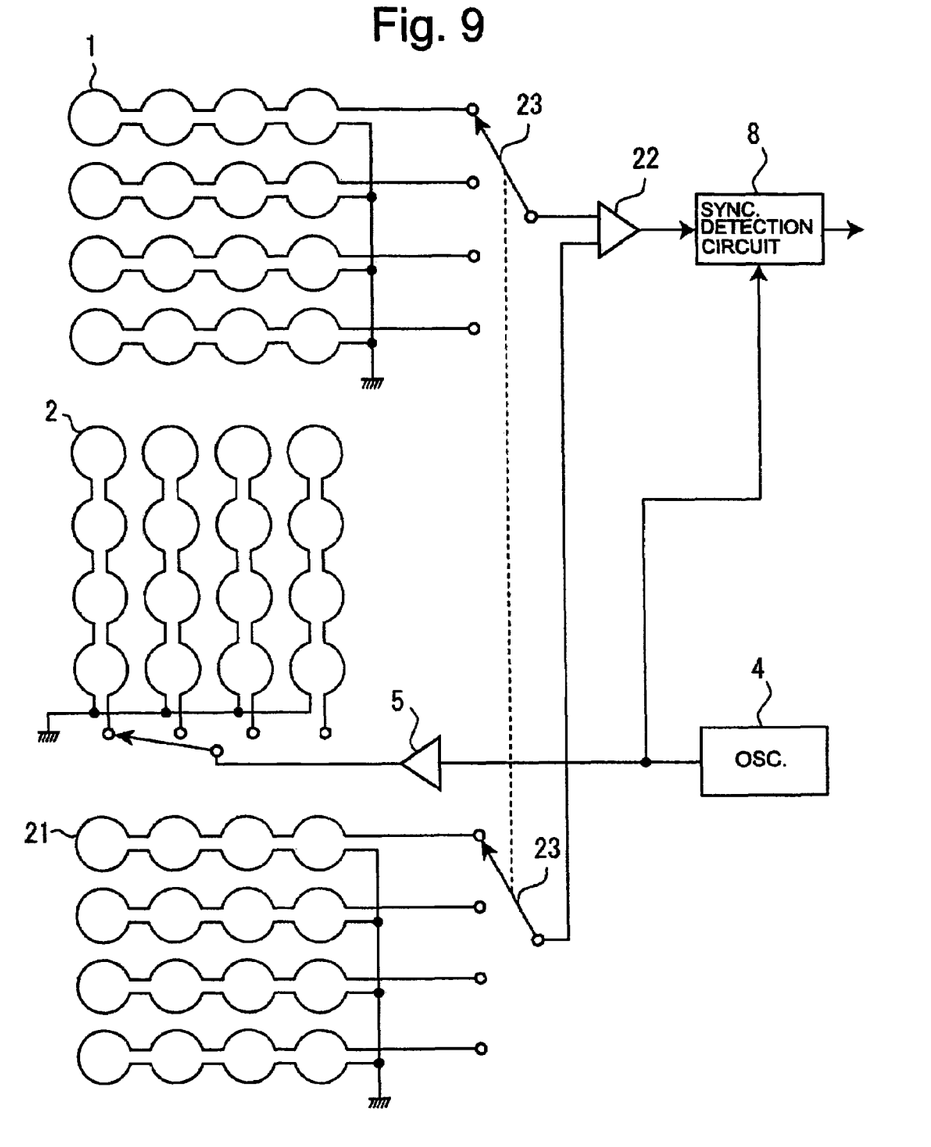
FIG. 9 is a schematic view for explaining another connection configuration in the pressure detecting apparatus of Example 2 according to the present invention

FIG. 9 is a schematic view for explaining another connection configuration in the pressure detecting apparatus of the second example according to the present invention. In FIG. 9, the layers are shown in the expanded views, respectively, in order to facilitate understanding of the connection configurations of the coil rows on the respective layers. For example, as shown in FIG. 9, the apparatus is designed such that the coil rows consisting of the second coils 2 are connected to the drive circuits to drive the coil rows, and that the difference between the signals resulting from electromagnetic coupling from the coil rows consisting of the first coils 1 and those consisting of the third coils 21 is detected to thereby detect pressure. In this case, the winding directions of the first coils 1 and the third coils 21 are same. Then, in this example, a differential amplifier 22 is used for detecting the difference between signals from the first coils 1 and the third coils 21, and the coil rows consisting of the first coils 1 and those of the third coils 21 are connected to the input terminal of the differential amplifier 22, respectively. Note that the corresponding rows at the upper and lower sides of the first coils 1 and the third coils 21 are connected such that they are actuated with the differential amplifier 22 in an interlocking manner with use of an interlocking switch 23. From the differential amplifier 22, signals corresponding to the difference between signals resulting from electromagnetic coupling between the coil rows consisting of the first coils 1 and the coils of the second coils 2 and signals resulting from electromagnetic coupling between the second coils 2 and the third coils 21 are outputted. These outputted signals are synchronized with the output from the oscillator at the drive circuit side and then detected in the synchronous detection section 8, whereby detection of the pressure distribution, that indicates against which locations in the coils disposed in a matrix state pressure is applied, can be effected.

Note that the pressure detecting apparatus utilizing electromagnetic coupling according to the present invention is not limited to the illustrated examples as described above, and various modifications of the apparatus can be made naturally within the scope that does not depart from the subject matter of the present invention. For example, though a plurality of first coils 1 are connected in the X-axis direction and then connected to the detection circuit, and a plurality of second coils 2 are connected in the Y-axis direction and then connected to the drive circuit in the illustrated example, or a plurality of third coils 21 are connected in the X-axis direction and then connected to the drive circuit and/or the detection circuit, the present invention is not limited to such a configuration, and the present invention includes other configurations, for example, where X-axis and Y-axis are reversed, or the drive circuit and the detection circuit are reversed. Furthermore, including the differentially-detecting mode, the sensor sections of the pressure detecting apparatus according to the present invention may be disposed in a matrix state in order to measure the pressure distribution, however, only one set of coils may be used when it is required to measure pressure in only a part.

The present invention can be utilized not only for performance assessment tests for car seats and investigation of visitor movements at a shop as described above but also for input pad for game machines and so on.

The invention claimed is:

1. A pressure detecting apparatus utilizing electromagnetic coupling comprising:
    a sensor section including first coils, second coils provided such that each center axis of the second coils are superimposed with each center axis of the first coils, a first cushion member provided between the first and second coils, third coils provided at a position where the second coils oppose to the first coils such that each center axis of the third coils are superimposed with each center axis of the second coils, and a second cushion member provided between the second coils and the third coils and having a modulus of elasticity which is different from that of the first cushion member, at least one of the first, second and third coils being bent by receiving pressure,
    a drive circuit for driving either of the first coils and the second coils, and
    a detection circuit for detecting pressure to be applied against the sensor section based on signals resulting from electromagnetic coupling from the other of the first coils and the second coils.

2. The pressure detecting apparatus as defined in claim 1, characterized in that the first coils and the third coils are wired such that they counteract magnetic field, the drive circuit causes the first coils and the third coils to drive, and the detection circuit detects signals resulting from electromagnetic coupling from the second coils.

3. The pressure detecting apparatus as defined in claim 2, characterized in that the apparatus is constructed so that it can measure the pressure distribution by disposing a plurality of the sensor sections in a matrix state, forming the first coils into a plurality of coil rows connected in series in the direction of the X-axis, respectively, forming the second coils into a plurality of coil rows connected in series in the direction of the Y-axis, respectively, and forming the third coils into a plurality of coil rows connected in series in the direction of X-axis, respectively.

4. The pressure detecting apparatus as defined in claim 1, characterized in that the drive circuit causes the second coils to drive and the detection circuit detects the difference between the signals resulting from electromagnetic coupling from the first coils and the third coils.

5. The pressure detecting apparatus as defined in claim 4, characterized in that the detection circuit includes a differential amplifier and the difference between the signals is detected by inputting the signals resulting from electromagnetic coupling respectively from the first coils and the third coils to the input terminal of the differential amplifier.

6. A pressure detecting apparatus utilizing electromagnetic coupling comprising:
    a sensor section including first coils, second coils provided such that each center axis of the second coils are superimposed with each center axis of the first coils, and a first cushion member provided between the first and second coils, at least one of the first and second coils being bent by receiving pressure,
    a drive circuit for driving either of the first coils and the second coils, and
    a detection circuit for detecting pressure to be applied against the sensor section based on signals resulting from electromagnetic coupling from the other of the first coils and the second coils,
    wherein the apparatus is constructed so that it can measure the pressure distribution by disposing a plurality of the sensor sections in a matrix state, forming the first coils into a plurality of coil rows connected in series in the direction of the X-axis, respectively, and forming the second coils into a plurality of coil rows connected in series in the direction of the Y-axis, respectively.

7. The pressure detecting apparatus as defined in claim 6, characterized in that the coil rows other than coils row to which the drive circuit or the detection circuit is connected are disconnected or opened.

8. The pressure detecting apparatus as defined in claim 6, characterized in that the apparatus further includes a switching means for connecting the coil rows to the drive circuit or the detection circuit in turn.

9. The pressure detecting apparatus as defined in claim 6, characterized in that one end of the respective coil rows is grounded and the other end thereof is connected with the drive circuit or the detection circuit, the drive circuit includes a plurality of current drivers for driving each of the plurality of coil rows to be driven with different wave forms, and the detection circuit includes a plurality of current amplifiers for receiving signals from each of the plurality of coil rows and a plurality of synchronous detection sections for separating the respective wave forms.

10. The pressure detecting apparatus as defined in claim 6, characterized in that each of the coils in the coil rows is planar with a shape of polygonal, such as approximately square and octagonal, or approximately round, is divided at the substantially central portion, and each of the divided coils is connected with the neighbor coils in series.

11. The pressure detecting apparatus as defined in claim 6, characterized in that the detection circuit includes a current amplifier of which input impedance is approximated to zero.

12. The pressure detecting apparatus as defined in claim 6, characterized in that the drive circuit includes a current driver of which output impedance is rendered at a high value.

13. The pressure detecting apparatus as defined in claim 6, characterized in that a central portion and/or a peripheral area of the coil is formed in a hollow state.

* * * * *

UNITED STATES PATENT AND TRADEMARK OFFICE
CERTIFICATE OF CORRECTION

PATENT NO.       : 7,703,341 B2           Page 1 of 1
APPLICATION NO.  : 10/580452
DATED            : April 27, 2010
INVENTOR(S)      : Yasuji Ogawa It is certified that error appears in the above-identified patent and that said Letters Patent is hereby corrected as shown below:

Column 3, line 24 – Replace "tp" with --to--.

Column 4, line 67 – Replace "1and" with --1 and--.

Signed and Sealed this
Nineteenth Day of April, 2011

David J. Kappos
*Director of the United States Patent and Trademark Office*